Aug. 24, 1954  G. C. CHENG  2,687,306
DECK OF PLAYING CARDS
Filed Sept. 23, 1952

INVENTOR.
George C. Cheng
BY Emery, Varney,
Whittemore & Dix.
ATTORNEYS

Patented Aug. 24, 1954

2,687,306

UNITED STATES PATENT OFFICE 2,687,306

DECK OF PLAYING CARDS

George C. Cheng, New York, N. Y.

Application September 23, 1952, Serial No. 311,111

3 Claims. (Cl. 273—152.44)

This invention relates to games and more especially to a card game in which the atmosphere is that of a baseball league or some other group of ball teams. Although the invention will be described as relating to a baseball game, and the cards illustrated show balls generally, it will be understood that the invention can be made for an atmosphere of some other ball game such as football or basketball and the balls shown on the cards may be the characteristic balls of the particular game selected.

It is an object of the invention to provide an improved, yet simple, card game in which the players represent different ball teams from various localities competing with one another for the championship, such as in the case of the baseball teams in an organized league. The game can be played by different rules, depending upon the intelligence of the players and the degree of concentration which they want the game to require. In this specification, the game will be described as played by the simplest rules, and one modification will be described in which the rules are somewhat more complicated for more mature players who want the more skillful game.

Other objects, features and advantages of the invention will appear or be pointed out as the description proceeds.

In the drawing, forming a part hereof, the different figures of the drawing represent different cards that are used in playing the game.

The pack of cards used for the game preferably consists of suits of numbered cards having different numbers of balls thereon, corresponding in general to the spot cards of a playing card deck. In addition to the ball cards, there are team cards and in the preferred embodiment of the invention, the team are designated North, East, South and West, corresponding to the positions of the players around a table. This is the simplest and most easily understood team designation, but it will be understood that other team cards can be used, for example, designating different cities, as in a baseball league; or different countries, as in international competitions, such as the Olympic games.

In addition to the specific team cards, there are also a few general team cards which can be used to represent any team and which can be also used as "wild" cards, in place of any missing ball cards which a player may need to complete a particular combination required for a winning hand.

In the deck illustrated in the drawing, Figures 1–9 represent a suit of 9 ball cards of different denominations from 1 to 9, inclusive. These ball cards have red balls. Each of these ball cards has the number of balls on its face corresponding to the numeral in the corner of the card.

Figs. 10 and 11 show team cards for East and West and these team cards are preferably printed in red, or some other color which is common to both cards. The reason for having this common color designation, which is different from the North-South team cards, is to bring out a relation, used when playing partners under the simplest rules, by which East and West comprise members of the same team, whereas North and South comprise members of another team.

In the simplest preferred way of playing the game of this invention, the game can be played by 2, 3 or 4 players. When 2 or 3 persons are playing, each one represents a different team. When the game is played by 4 persons, they may each represent a different team or they may play partners.

Figure 1:
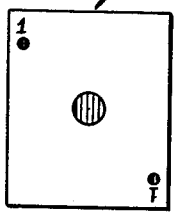
Figure 2:
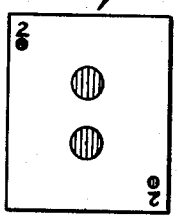
Figure 3:
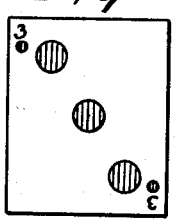
Figure 4:
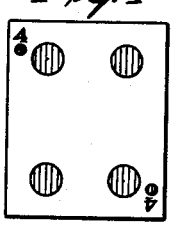
Figure 5:
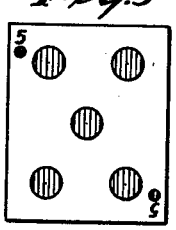
Figure 6:
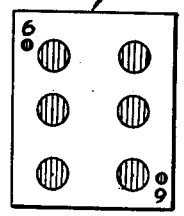
Figure 7:
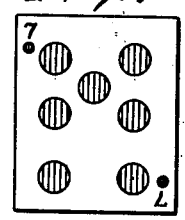
Figure 8:
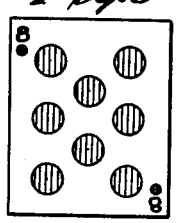
Figure 9:
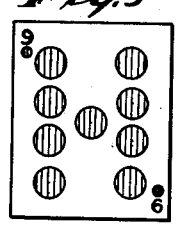
Figure 10:
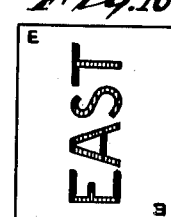
Figure 11:
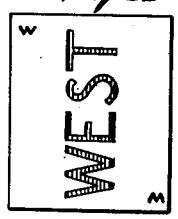
Figure 12:
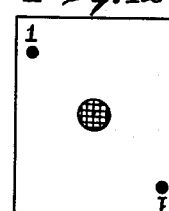
Figs. 12–20 illustrate cards corresponding to Figs. 1 to 9 but representing a suit of ball cards having a different color from the ball cards of Figures 1–9. In the illustrated cards, the balls of the suits shown in Figs. 12–20 are black.
Figure 13:
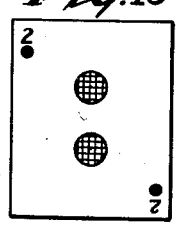
Figure 14:
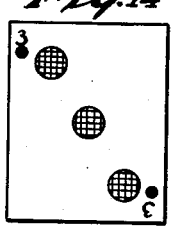
Figure 15:
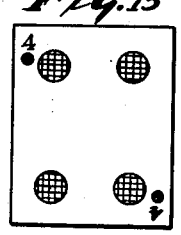
Figure 16:
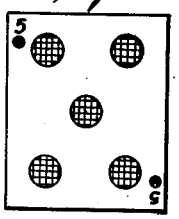
Figure 17:
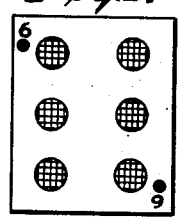
Figure 18:
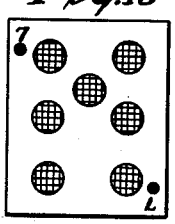
Figure 19:
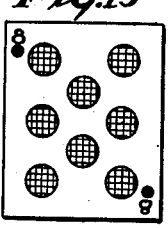
Figure 20:
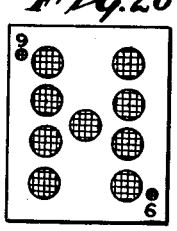
Figure 21:
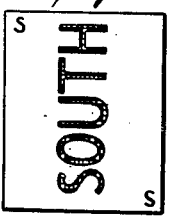
Figs. 21 and 22 illustrate the South and North team cards. These are preferably the same color to indicate that the players at the North and South positions at the table are members of the same team when playing with four players and with opposite players partners, as previously explained.
Figure 22:
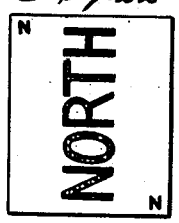
Figure 23:
Fig. 23 shows a general team card which can be used by either the East-West or North-South teams, or any team, as will be explained more fully, and this card is also designated as the "lucky ball" card because it can be used as a wild card when playing the game according to the preferred rules.

In the preferred deck there are four cards corresponding to each of the cards illustrated in the drawing, that is, there are 4 ball cards having one red ball and 4 ball cards having 2 red balls, etc. When there are only two persons playing the game, it is advisable to remove two or the general team cards or lucky ball cards, shown in Fig. 23, so as to prevent the game from being too short.

The object of the game is to obtain a hand in which all of the cards held are parts of several designated combinations of cards, suits, sequences or books of similar cards combined with a team card designating a particular player's own team which makes the group with which it is associated count as a score for that team.

The approved combinations of cards include series consisting of three or more cards of the same color with consecutive numbers, for example, red balls having 1, 2 and 3 balls, respectively, or 2, 3 and 4 balls, etc.; or black ball cards having similar sequences of numbers. Each series of 3 cards must be combined with a team card in order to score, and the team card must represent the team of the player holding the particular series. For example, a player sitting in the East position must have an East team card combined with each series in order to make the series count for his team.

If the game is being played by partners, then the person sitting in the East position is a member of the East-West team and he can combine either an East or a West card with his series in order to make it score for his team. A general team card, illustrated in Fig. 23, may be used by a player on any team.

Other combinations of cards that the players aim to combine are known as "suits." A suit consists of 3 or 4 ball cards of the same color and number; but like the series cards, each suit must have also a team card designating the team of the player holding the suit in order to have the suit score for the team requested by that player.

A player can also collect pairs of cards such as two red ball cards of the same number, and these are useful in making up a hand with which the player can "call off" the game, but pairs of cards do not count in the scoring.

The game is played by dealing 13 cards to each player. The remainder of the pack is placed face down in the center of the table. Each player, in turn, takes a card from the top of the pack and discards a card which is placed face up in a discard pile in the center of the table.

Instead of taking a card from the top of the pack, a player may pick a card from the discard pile if the card picked can be used to make the series or a suit, and the series or suit made by the card taken from the discard pile, must be placed on the table, face up, in front of the player. If the card taken from the discard pile is to be used to make a series, a player can only pick the discard thrown down by the player on his right hand; however, a player may take any card from the discard pile in order to make a suit or when the taking of that card will make a hand on which the player is going to call the game off.

When a player has a suit of 4 cards, he must place the cards face up on the table in front of him and upon doing so, he is entitled to pick one extra card from the top of the pack.

A player makes a "hit" when he can make a suit by taking a discard thrown down by any player. When a discard is needed by two players at the same time, the one who needs the card to make a suit has priority over someone who needs the card to make a sequence. The reason for this rule is that a suit can be made only by acquiring a card of the same number as the other cards with which it is to be combined. A player who is trying to make a sequence, however, and who has, for example, a 7 and an 8, can make the sequence with either a 6 or a 9 and has, therefore, more chance of acquiring a card which will make the sequence than has a player who is trying to complete a suit.

A hand is complete whenever a player calls the game off, at which time all players lay down their hands and the score of each player for that hand of play is computed. Any player may call the game off at any time that his hand meets the following conditions:

1. Contains at least 14 cards.
2. Contains at least 1 pair, and all other cards in the hand combine in either pairs or series or suits.

A player is not required to call the game off merely because he has a hand which permits him to do so. He may prefer to continue to play in the hopes that he can convert some of his pairs to suits, and in hopes of acquiring more team cards to combine with series or suits to obtain a score from these series or suits.

In the scoring, 100 points goes to the player who calls the game off. A series with a team card of the player counts 5 points; and a suit of three cards and proper team card counts 10 points; and a suit of 4 cards and proper team card counts 20 points.

The game may be played for a certain number of rounds, hands or innings, or until the score of one team exceeds a predetermined number of points, this being optional with the players, depending partly upon how long a time they have for the game.

For more mature players, the game is made more interesting by playing with somewhat more elaborate rules, for example, additional ways of gaining points are provided. The game may be called off by making a "Local Game," or a "Champion," or a "Flush," or an "East-West Flush Champion," or a "North-South Flush Champion," or a "World Champion."

Calling the game off by making a local game requires that the player have all cards of both colors but not have team cards of the opposing team.

A player becomes a champion if he has 3 or more of the team cards of his team. This doubles his score. A flush is a hand in which all of the ball cards are of the same color. Such a hand gives a player a score of 500 extra points.

A flush champion is a hand in which a player has at least 3 team cards of his team, and the remainder of his cards are ball cards of the same color. In pairs, sequences or suits, this gives a player an extra score of 1,000 points.

An East-West flush champion is a hand held by one of the partners of the East-West team and having at least 3 East team cards and at least 3 West team cards with all of the remaining cards ball cards in pairs, sequences or suits of the same color. Such a hand gives a player an additional 2,000 points on his score. A North-South flush champion is a hand corresponding to the East-West flush champion but held by one of the partners of the North-South team.

World Champion is a hand holding at least 3 team cards of East-West and North-South teams. This is the most difficult hand to obtain and entitles a player to an extra 5,000 points on his score.

The preferred embodiment of the invention has been described, bringing out the feature whereby the ball teams must combine particular combinations of ball cards and team cards in order to acquire winning scores. Various changes and modifications of the rules can be made, combining the balls of the game with the geographical team location cards to produce a game of interest and skill.

What is claimed is:

1. A card game representing competition between ball teams from different geographical locations, the said game including a plurality of cards having representations of balls thereon, these cards including at least two suits of different color, but with all of the cards in the same suit having the same color, each suit including cards with different numbers of ball representations thereon and also several cards having the same number of ball representations on them, a plurality of geographical cards having legends thereon representing North, East, South and West as the home location for the various teams, the geographical cards for the North and South teams being of the same color and of a color corresponding to one of the suits of the ball representation cards, and the East and West geographical cards being of the same color and of the same color as the other suit of ball representation cards, and at least one other geographical card having a representation of the globe thereon and with designations of North, East, South and West representing a combination of all of the individual geographical cards.

2. A card game, including a plurality of cards, each of which has on one face a representation of balls used for a game having team play, other cards with geographical representations thereon indicating geographical locations which may be represented by the individual ball team, and at least one other card representing the entire geographical section in which the teams represented by the other geographical location cards are included, the cards with the representations of balls thereon including cards of at least two suits which are of different colors, and each of which includes a number of cards with different numbers of ball representations on them and several cards having the same number of ball representations thereon and each of said other cards with the geographical representations thereon including markings which identify it with one or another of the colored card suits.

3. A card game, including a plurality of cards, each of which has on one face a representation of balls used for a game having team play, and other cards with geographical representations thereon indicating geographical locations which may be represented by the individual ball team, the cards with the representations of balls thereon including cards of at least two suits which are of different colors, and each of which includes a number of cards with different numbers of ball representations on them and several cards having the same number of ball representations thereon, and each of said other cards with the geographical representations thereon including markings which identify it with one or another of the colored card suits.

References Cited in the file of this patent

UNITED STATES PATENTS

| Number | Name | Date |
|---|---|---|
| 305,315 | Lawson | Sept. 16, 1884 |
| 1,026,188 | Watts | May 14, 1912 |
| 1,704,457 | Bedard | Mar. 5, 1929 |